United States Patent Office 3,466,374
Patented Sept. 9, 1969

3,466,374
PROCESS FOR CONTROLLING INSECTS WITH 2-BUTYNYLENE 1,4-BIS(PHENYLCARBAMATES)
Herbert Q. Smith, King of Prussia, and Edward Everett Ivy, Devon, Pa., assignors to Pennsalt Chemicals Corporation, Philadelphia, Pa., a corporation of Pennsylvania
No Drawing. Filed Feb. 16, 1966, Ser. No. 527,771
Int. Cl. A01n 9/20; C07c 125/06
U.S. Cl. 424—300        4 Claims

ABSTRACT OF THE DISCLOSURE

Control of insects with 2-butynylene bis(N-arylcarbamates).

---

This invention relates to the control of insects and is particularly concerned with the use of 2-butynylene bis-(N-arylcarbamates) as insecticides.

In accordance with the invention insecticidal compositions are provided comprising an inert carrier and a 2-butynylene bis(N-arylcarbamate) having the structural formula

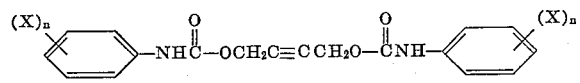

where X is selected from the group consisting of hydrogen, halogen (e.g. chlorine, bromine, fluorine, and iodine), alkyl and alkoxy containing one to six carbon atoms and nitro, and where $n$ is an integer from 1 to 5. The active compounds may be made by reaction of 2 moles of the appropriate phenyl isocyanate with one mole of 2-butyne-1,4-diol in accord with the process of Johnson disclosed in Journal Chemical Society, 1946, 1009. The preferred compounds useful in the invention are those where X in the above formula is hydrogen or chlorine.

The compounds described above are formulated into insecticidal compositions by preparing solutions or dispersions of the active agent in one or more of the common solvents normally used as a carrier. Thus, for example the active agents may be dissolved in organic liquids such as ketones (acetone methyl ethyl ketone, etc.), amides (dimethylacetamide, dimethylformamide, etc.), aromatic hydrocarbons such as benzene, toluene, and xylene, alcohols and glycols, and various oxygen containing industrial organic solvents and the like. Dispersions may also be prepared by diluting the organic solvent system with water in the presence or absence of a surface active agent, and the formulations of the invention may also be employed in aerosol formulations where difluorodichloromethane and similar aerosol propellants are used to form the propellant and dispersion. Likewise, the active agent may be formulated into dusts and powders where the inert carrier will be a clay such as fuller's earth, china clay, kaolin, attapulgite, bentonite and the related aluminum silicates. Likewise, other finely divided inorganic solids may be used as a carrier and in general, dusts prepared for this type of formulation will have a particle size below about 200 mesh and contain the active ingredient at a concentration ranging from about 0.5 to 10% by weight of the total formulation. The formulations may be sprayed or dusted in the usual manner onto the particular substrate to be protected against insect attack.

The concentration of active agent in the formulations will vary widely depending upon the particular type and upon the particular method of application. In general, formulations containing from about 0.1% to about 80% by weight will be used. Rates of application will vary also depending upon the insect and the crop to be protected, but in general rates of application from 0.5 to 10 pounds per acre will be used.

The active agents as described above by the chemical formulae are effective against mosquito larvae (*Aedes aegypti*), cabbageworm (*Pieris rapae*), bollworm (*Heliothis zea*), cabbage looper (*Trichoplusia ni*), tent caterpillar (*Malacosoma Americanum*), corn rootworm, (*Diabrotica longicornis*), tussock moth larvae (*Halisidota maculota*), potato leafhopper (*Empoasca fabae*), and onion maggot (*Hylemya antiqua*). The agents are particularly effective against mosquito larvae, bollworm and cabbage looper.

In order to further illustrate the invention, the following examples are given:

EXAMPLE 1

A 0.1% solution of 2-butynylene 1,4-bis(N-phenylcarbamate) in acetone was prepared and this solution subsequently diluted with water to a concentration of active agent of 10 p.p.m. Mosquito larvae (*Aedes aegypti*) were placed in this test solution and after 48 hours it was observed that from 70 to 90% kill was obtained.

EXAMPLE 2

In a test similar to that of Example 1, 2-butynylene 1,4-bis-[N-(4-chlorophenyl)carbamate] gave 100% control of mosquito larvae after 48 hours at 10 p.p.m. At 1 p.p.m. 80 to 85% control was obtained in 48 hours.

EXAMPLE 3

A formulation containing 10% by weight of 2-butynylene 1,4-bis[N-(4-chlorophenyl)carbamate] in xylene and containing an emulsifier was diluted with water and was applied at 2 pounds per acre to a field of cabbage. The test showed 100% control of the imported cabbageworm.

EXAMPLE 4

In a test similar to that of Example 3, two pounds per acre of 2-butynylene 1,4-bis[N-(4-chlorophenyl)carbamate] in xylene containing an emulsifier and water achieved 100% control of cabbage loopers when sprayed on infested cabbage plants in the field.

EXAMPLE 5

When 2-butynylene 1,4-bis[N-(4-chlorophenyl)carbamate] in xylene containing an emulsifier was diluted with water so that the resulting composition contained 1 pound of the active compound per 100 gallons and the latter was sprayed on wild cherry leaves infested with tent caterpillars, the caterpillars stopped feeding almost immediately and only 20% of the sprayed leaves were consumed. In a control test, unsprayed leaves were completely consumed by the caterpillars.

EXAMPLE 6

In a test similar to that of Example 5, only 10% feeding occurred on apple leaves infested with tussock moth larvae following a spray application containing one half pound of 2-butynylene 1,4-bis[N-(4-chlorophenyl)carbamate] in xylene plus an emulsifier per 100 gallons of water. Unsprayed apple leaves were completely eaten by the larvae.

EXAMPLE 7

When 0.01 milliliter of an acetone solution of 2-butynylene 1,4-bis[N-(4-chlorophenyl)carbamate]] was applied to the dorsum of each of ten third instar bollworm larvae, 100 percent control was obtained when the concentration in acetone was such that each larvae received 1 milligram of the test compound. Eighty percent control was obtained in a similar test where the test dosage was one tenth of a milligram per larva.

In addition to the compounds illustrated above the following specific compounds may be used in a similar manner to achieve control of insects:

2-butynylene 1,4-bis[N-(2-chlorophenyl)carbamate]
2-butynylene 1,4-bis[N-(3-chlorophenyl)carbamate]
2-butynylene 1,4-bis[N-(2,4-dichlorophenyl)carbamate]
2-butynylene 1,4-bis[N-(3,4-dichlorophenyl)carbamate]
2-butynylene 1,4-bis[N-(2,5-dichlorophenyl)carbamate]
2-butynylene 1,4-bis[N-(2-methoxyphenyl)carbamate]
2-butynylene 1,4-bis[N-(4-methoxyphenyl)carbamate]
2-butynylene 1,4-bis[N-(4-ethoxyphenyl)carbamate]
2-butynylene 1,4-bis[N-(4-nitrophenyl)carbamate]
2-butynylene 1,4-bis[N-(4-bromophenyl)carbamate]
2-butynylene 1,4-bis[N-(3-nitrophenyl(carbamate]
2-butynylene 1,4-bis[N-(2,4,6-trinitrophenyl)carbamate]
2-butynylene 1,4-bis[N-(4-isobutylphenyl)carbamate]
2-butynylene 1,4-bis[N-(p-tolyl)carbamate]
2-butynylene 1,4-bis[N-(m-tolyl)carbamate]
2-butynylene 1,4-bis[N-(o-tolyl)carbamate]
2-butynylene 1,4-bis[N-(2,4,6-trimethylphenyl)carbamate]
2-butynylene 1,4-bis[N-(3,5-diisopropylphenyl)carbamate]
2-butynylene 1,4-bis[N-(4-hexylphenyl)carbamate]

Surprisingly, we have found that when a related carbamate compound (e.g. $C_6H_5NHCO_2(CH_3)_2C{\equiv}CH$) is evaluated as an insecticide it shows no activity in primary screening tests. Thus, there appears to be a high degree of specificity in the need for the bis compounds described above.

It will be understood that numerous changes and variations may be made from the above description and examples without departing from the spirit and scope of the invention.

We claim:
1. A process for controlling insects which comprises contacting said insects with an insecticidal amount of a compound of the structure

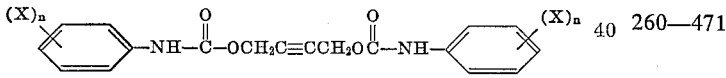

where X is selected from the group consisting of hydrogen, halogen, alkyl and alkoxy containing from one to six carbon atoms, and nitro, and $n$ is an integer from 1 to 5.

2. A process as in claim 1 where the active agent is 2-butynylene 1,4-bis(N-phenylcarbamate).

3. A process as in claim 1 where the active agent is 2-butynylene 1,4-bis[N-(4-chlorophenyl)carbamate].

4. A process for controlling imported cabbageworm which comprises contacting said insects with an insecticidal amount of 2-butynylene 1,4-bis[N-(4-chlorophenyl)carbamate].

References Cited

UNITED STATES PATENTS

| | | | |
|---|---|---|---|
| 2,906,614 | 9/1959 | Hopkins et al. | 260—471 |
| 2,938,049 | 5/1960 | Johnson et al. | 260—471 |
| 2,946,716 | 7/1960 | Hessel | 167—22 |
| 3,127,408 | 3/1964 | Hopkins | 260—471 |
| 3,203,949 | 8/1965 | Hopkins et al. | 260—207.1 |
| 2,990,318 | 6/1961 | Jones et al. | 424—300 |
| 3,084,096 | 4/1963 | Lambrech | 424—300 |
| 3,202,573 | 8/1965 | Haubein | 424—300 |
| 3,296,068 | 1/1967 | Addor | 424—300 |
| 3,356,713 | 12/1967 | Richter | 424—300 |

FOREIGN PATENTS 916,575  1/1963  Great Britain.

OTHER REFERENCES

Johnson, "2-Butyne-1,4-Diol," cited by applicants.
Kolbezen et al.: "Insecticidal Activity of Carbamate Cholinesterase Inhibitors," (1954), Ag. & Food Chem., vol. 2, pp. 864–70.

LEWIS GOTTS, Primary Examiner

G. HOLLRAH, Assistant Examiner

U.S. Cl. X.R.

260—471